Patented Feb. 13, 1940

2,190,604

UNITED STATES PATENT OFFICE 2,190,604

PRODUCTION OF BITUMINOUS EMULSIONS

John Alexander Montgomerie, Cambuslang, and Peter Kennedy Archibald, Rutherglen, Scotland, assignors to American Bitumuls Company, San Francisco, Calif., a corporation of Delaware No Drawing. Application May 16, 1938, Serial No. 208,204. In Great Britain July 2, 1935

13 Claims. (Cl. 134—1)

This invention relates to the preparation of aqueous emulsions of pyrogenous residues of organic substances, namely, pitches, tars, tar-like substances, bituminous substances of natural or artificial origin, such as asphalt and asphaltite products, and, in general, emulsions of viscous hydrocarbons or pitchy or tarry organic liquids.

Such emulsions may in general be used for binding, adhesive, impregnating and surfacing purposes. Wood, felts, paper or pulps of those materials may be impregnated or surfaced with such emulsions in order to impart characteristics of the emulsified substances to the treated materials. Such emulsions may also be used for road construction, for application to the roadway or to materials used in forming the roadway and for analogous purposes.

In general protein stabilizers are incompatible with fatty acid soap-type bituminous emulsions. This is particularly true of alkaline quick-breaking or penetration bituminous emulsions containing fatty acid soaps as auxiliary emulsifying agents for difficultly emulsifiable pyrogenous residues of organic substances which are not readily dispersible in alkaline water alone. This incompatibility is so pronounced that it has not heretofore been regarded as commercially feasible to use colloidal proteins such as casein for stabilizing quick-breaking emulsions containing fatty acid soaps to convert the emulsion to one of the slow-breaking type.

We have discovered that fatty acid pitches and protein colloids comprise a compatible combination for dispersing bituminous materials in alkaline aqueous media and for stabilizing such dispersions. We have further discovered a critical sequence of steps which yields an emulsion having new and unpredictable improved properties.

In general our process includes as essential steps the admixture with the asphalt or pitch or tar or tar-like substance constituting the main body to be emulsified of a proportion of fatty acid pitch, as an assistant emulsifier, and the incorporation in the emulsion of a protective colloid which may perform the duties both of an emulsifier and a stabilizer.

The order of performance of the steps in the practice of the process is of importance, as will be more particularly pointed out hereinafter.

Suitable protective colloids are proteins, including glues, gelatins, albumens, casein, etc.

For example, there is prepared a 10% solution of sodium or potassium caseinate dissolved in alkali or in an alkaline salt, which solution may be alkaline or neutralized with some suitable acid such as tannic acid, boric acid or the like. This solution may or may not be protected from putrefaction or decomposition by the addition of suitable protective agents such as cresylic acid or formaldehyde, for example.

The bodies to be emulsified and included in the terms pitches or tars are, in general, the residues produced from organic substances which decompose when subjected to destructive distillation in complete or partial absence of air to such an extent that a complete carbon residue is not produced. Coal tar pitches in general comprise difficultly emulsifiable pyrogenous residues as do also the harder petroleum asphalts. Emulsification of the latter type of materials presents difficult problems which are not encountered with Mexican asphalt and other more easily dispersible materials.

Softer varieties of pitches, etc., may be made harder by combining them with the harder varieties and then emulsified, or, alternatively, the harder varieties may be softened by combining them with the softer varieties or with a flux and then emulsified.

In the operation of the process the pitch or asphalt or tar or the like forming the main body to be emulsified is melted and preferably allowed to cool until it reaches the lowest temperature at which it is fluid. With this pitch and/or asphalt and/or tar or the like a percentage of fatty acid pitch, such as stearine pitch, is thoroughly mixed.

The water phase contains a small percentage of alkali, alkaline salts of organic or inorganic acids or esters or gels from which alkali is liberated by hydrolysis, and protective colloid, such as casein, which may be alkaline or neutral, in a state of solution.

The pitch or asphalt or tar or the like with added fatty acid pitch at 105° to 110° C., may be stirred into an aqueous solution of alkali and casein at 90° to 100° C., followed by addition of the final amount of water either hot or at normal temperature.

Or part of the fatty acid pitch may be mixed with the main body of pitch or asphalt or tar or the like to be emulsified, the other part of the fatty acid pitch being added to the water phase, and the whole stirred together with good agitation, temperatures being as previously stated above. The essential feature, insofar as the order of the process steps is concerned, is that both the stearine pitch and protein should be present during emulsification. Hence, the stearine pitch may be added to the alkaline water, to the pitch or asphalt, or to both.

In a practical example there are employed:
90 parts of coal tar pitch.
10 parts of stearine pitch (soft grade).
0.5% caustic potash (KOH) reckoned on the total weight of the pitches.
Casein solution formed from 56 parts of casein,
10 parts KOH (50% solution) caustic potash or 10 parts NaOH (70° Twaddell) caustic soda,
494 parts water, and
11 parts cresylic acid.

The procedure may be as follows:
200 parts of the admixed pitches at 105° to 110° C. are stirred into 45 parts of casein solution mixed with 35 parts of the water phase containing all the alkali at 100° C., followed by the addition of 120 parts of water which may be hot, but not necessarily at 100° C.

It is also possible to add part of the stearine pitch to the water phase, the other part being melted in the pitch or tar or the like.

The procedure described above may be reversed, e. g., part of the water containing all of the alkali mixed with the casein solution may be stirred into the mixed pitches, etc., followed by the addition of the remainder of the water phase.

The joint use of a fatty acid pitch and a protein such as casein is an essential feature of the invention. The protein compound should be present or added during formation of the emulsion and not simply incorporated in a preformed emulsion if certain desirable but unexpected properties are to be obtained. When the protein, casein for example, is present during the emulsification it is interfacially positioned and cooperates with the soaps of the fatty acid pitch also interfacially positioned to produce more efficient emulsification and stabilization and to yield a low viscosity stable emulsion. If the protein is added to the preformed emulsion it is present as a hydrated constituent in the continuous aqueous medium and results in an emulsion having properties different from those produced when it is interfacially positioned.

In order to clearly demonstrate the relative merits of the present invention the following additional data are given:

An emulsion of a difficultly emulsifiable asphalt was prepared utilizing the following proportion of ingredients:

|   | Per cent |
|---|---|
| Asphalt (180 to 200 pen.) | 55 |
| Oleic acid | 2.2 |
| NaOH | 0.28 |
| Casein solution | 11.25 |
| Water | 31.27 |

The casein solution contained the following proportion of ingredients:

|   | Per cent |
|---|---|
| Casein | 9.81 |
| KOH | 0.88 |
| Water | 89.31 |

This emulsion was prepared by first blending the asphalt and oleic acid, emulsifying the blend in the caustic water solution and adding the casein solution as a stabilizing agent. The emulsion so prepared was a very poor coarse product and the casein was inoperative to stabilize the quick-breaking emulsion to a mixing emulsion as shown by the following standard tests thereon:

|   | Per cent |
|---|---|
| Residue | 52.9 |
| Demulsibility (with .02 N. CaCl₂) | 59.5 |
| Demulsibility (with 0.1 N. CaCl₂) | 87.6 |
| Cement mixing test | Failed |

It is to be noted that a fatty acid pitch or casein alone in the relatively small proportions utilized in the present invention is inoperative to produce satisfactory mixing emulsions of difficultly emulsifiable asphalts of the type utilized in the previously described tests. Proteins and fatty acid pitches cooperate to produce a superior emulsion of the same difficultly emulsifiable asphalt as illustrated by the following series of data:

| Emulsion | No. 1 | No. 2 | No. 3 | No. 4 |
|---|---|---|---|---|
| Asphalt percent | 50 | 50 | 45 | 45 |
| Soft stearine pitch No. 1 | 0 | 0 | 5 | 5 |
| KOH | 0.21 | 0.125 | 0.21 | 0.125 |
| Casein solution | 0 | 11.25 | 0 | 11.25 |
| Water | 49.79 | 38.625 | 49.79 | 38.65 |
| Percent by weight of dry casein in mixture | 0 | 1.104 | 0 | 1.104 |

In each of the above tests an attempt was made to emulsify the asphalt or asphalt pitch blend in the aqueous solution of the remaining ingredients. In these tests it was found that the asphalt alone would not emulsify in the caustic alone, that the asphalt alone would not emulsify in the alkaline casein solution alone and that the asphalt and pitch blend emulsified in the caustic solution alone only with difficulty and gave an emulsion which broke on standing and that emulsification of the pitch-asphalt blend in the alkaline caseinate solution of Test #4 was effected without difficulty and yielded the only emulsion which passed a cement mixing test.

It has been previously stated herein that the sequence of steps of preparing bituminous emulsions with stearine pitch and protein emulsifying and stabilizing agents is an essential feature of the invention. A sequence of steps in which the protein is present during emulsification is necessary and critical insofar as inhibiting increase in viscosity and production of low viscosity emulsions is concerned. Two emulsions were prepared having the following compositions:

|   | No. 5 | No. 6 |
|---|---|---|
| Asphalt | 45 | 45 |
| Soft stearine pitch No. 2 | 5 | 5 |
| KOH | 0.21 | 0.125 |
| Casein solution | 11.25 | 11.25 |
| Water | 38.54 | 38.625 |
| Percent casein by weight | 1.104 | 1.104 |
| Viscosity | 208 | 68.4 |

The method of preparation of these emulsions was identical in every respect except that the asphalt-pitch blend of No. 5 was emulsified in caustic solution alone and the casein added to the preformed emulsion, whereas the asphalt-pitch blend of No. 6 was emulsified in caustic solution to which the casein solution had already been added. It is to be noted that the viscosity of the latter emulsion was only 68.4 seconds as compared with 208 seconds for emulsion No. 5.

The asphalt utilized in the above series of comparative tests was one obtained from a West Texas crude oil. The asphalt was not emulsible in caustic solution alone, had a saponification value of 0.4 to 0.5 and a penetration of from 180–200.

Although the present invention finds its greatest utility in the production of emulsions of difficultly emulsifiable pyrogenous residues of organic materials, it will be apparent to one skilled in the art that the invention in its broader aspects is not limited to dispersion of such materials but that the advantages thereof may be utilized in the emulsion of other organic pyrogenous residues as hereinbefore disclosed. Likewise, it will be apparent that the temperatures given in the specific examples are not critical and may vary widely depending upon the particular product being emulsified. For example, the temperature of the pyrogenous residue will depend upon its melting point and upon the temperature of the water in which it is being dispersed. If the temperature of the water is high the temperature of the pyrogenous material may be relatively low or vice versa. The temperature of the combined water and pyrogenous materials may be as low as 35° C. (or even less with very soft pyrogenous residues) or as high as, or even higher than, 150° C.

This application is a continuation-in-part of our copending application Serial No. 87,960, for Production of bituminous emulsions, filed June 29, 1936.

While the character of this invention has been described in detail and numerous illustrative examples given, this has been done by way of illustration only and with the intention that no limitation should be imposed upon the invention thereby. It will be apparent to those skilled in the art that numerous modifications and variations may be effected in the practice of the invention within the scope of the appended claims.

We claim:

1. In a process of preparing a slow-breaking mixing emulsion of difficultly emusifiable pyrogenous residue of organic substances which residue is not emulsible in dilute aqueous alkali alone, the steps of blending said residue with a fatty acid pitch, dispersing said blend in an aqueous alkaline solution containing a protein colloid whereby said fatty acid pitch reacts with the alkali in said aqueous solution to cause emulsification and said protein immediately stabilizes said emulsion as formed thereby preventing partial breaking or agglomeration of dispersed particles and inhibiting increase in viscosity of said emulsion.

2. A process as defined in claim 1 in which the protein is casein.

3. A process of preparing a slow-breaking aqueous emulsion of difficultly emulsifiable pyrogenous residue of organic substances which residue is not emulsifiable in dilute aqueous alkali alone which comprises blending said residue with a fatty acid pitch as an assistant emulsifier, commingling said blended mixture in a fluid state with a dilute aqueous alkali solution to form an emulsion and incorporating a protein colloid in the aqueous phase as an auxiliary emulsifier and emulsion stabilizer.

4. A process as defined in claim 3 in which only a part of the aqueous phase of the completed emulsion is present during initial emulsification and the remainder of said aqueous portion is added after said initial emulsification.

5. A process as defined in claim 3 in which the fatty acid pitch is stearine pitch.

6. A process as defined in claim 3 in which the protein is casein.

7. A process as defined in claim 3 in which the proportion of fatty acid pitch to pyrogenous residue is of the order of 10% in which the protein is casein.

8. In a process of preparing a slow-breaking mixing emulsion of difficultly emusifiable pyrogenous residue of organic substances which residue is not emulsible in dilute aqueous alkali alone, the step of dispersing said residue in an aqueous alkaline solution in the presence of a fatty acid pitch and a protein colloid, whereby said fatty acid pitch reacts with the alkali in said aqueous solution to cause emulsification and said protein immediately stabilizes said emulsion as formed, thereby preventing partial breaking or agglomeration of dispersed particles.

9. A process as defined in claim 8 in which the protein is casein.

10. A process as defined in claim 1 in which the fatty acid pitch is stearine pitch.

11. A process as defined in claim 8 in which the fatty acid pitch is stearine pitch.

12. A process of preparing a slow-breaking aqueous emulsion of pyrogenous residue of organic substances which comprises blending said residue with a fatty acid pitch as an assistant emulsifier, commingling said blended mixture in a fluid state with a dilute aqueous alkali solution to form an emulsion and incorporating a protein colloid in the aqueous phase as an auxiliary emulsifier and emulsion stabilizer.

13. In a process of preparing a slow-breaking mixing emulsion of pyrogenous residue of organic substances, the steps of blending said residue with a fatty acid pitch, dispersing said blend in an aqueous alkaline solution containing a protein colloid whereby said fatty acid pitch reacts with the alkali in said aqueous solution to cause emulsification and said protein immediately stabilizes said emulsion as formed thereby preventing partial breaking or agglomeration of dispersed particles and inhibiting increase in viscosity of said emulsion.

JOHN ALEXANDER MONTGOMERIE.
PETER KENNEDY ARCHIBALD.